United States Patent
Wickström et al.

(10) Patent No.: US 10,323,575 B2
(45) Date of Patent: Jun. 18, 2019

(54) GAS TURBINE FUEL PIPE COMPRISING A DAMPER

(71) Applicant: ANSALDO ENERGIA SWITZERLAND AG, Baden (CH)

(72) Inventors: Anders Martin Axel Wickström, Bad (CH); Devis Tonon, Turgi (CH); Mirko Ruben Bothien, Zürich (CH)

(73) Assignee: ANSALDO ENERGIA SWITZERLAND AG, Baden (CH)

( * ) Notice: Subject to any disclaimer, the term of this patent is extended or adjusted under 35 U.S.C. 154(b) by 371 days.

(21) Appl. No.: 14/975,241

(22) Filed: Dec. 18, 2015

(65) Prior Publication Data

US 2016/0177836 A1    Jun. 23, 2016

(30) Foreign Application Priority Data

Dec. 19, 2014   (EP) .................................. 14199193

(51) Int. Cl.
| | |
|---|---|
| *F02C 7/22* | (2006.01) |
| *F23D 14/46* | (2006.01) |
| *F23D 11/36* | (2006.01) |
| *F23M 20/00* | (2014.01) |
| *F23R 3/28* | (2006.01) |

(52) U.S. Cl.
CPC ................ *F02C 7/222* (2013.01); *F02C 7/22* (2013.01); *F23D 11/36* (2013.01); *F23D 14/46* (2013.01); *F23M 20/005* (2015.01); *F23R 3/28* (2013.01); *F05D 2220/32* (2013.01);

(Continued)

(58) Field of Classification Search
CPC .. F02C 7/24; F02C 7/222; F23D 11/36; F23D 14/46; F23D 2210/00; F23R 2900/00014; F23M 20/005
See application file for complete search history.

(56) References Cited

U.S. PATENT DOCUMENTS

| | | | | |
|---|---|---|---|---|
| 4,258,544 A | * | 3/1981 | Gebhart .................. | F02C 7/222 60/742 |
| 7,464,552 B2 | * | 12/2008 | Sattinger ................. | F02C 7/222 60/725 |

(Continued)

FOREIGN PATENT DOCUMENTS

| | | |
|---|---|---|
| CN | 102588503 A | 7/2012 |
| CN | 102956228 A | 3/2013 |
| WO | WO 2014/173660 A1 | 10/2014 |

OTHER PUBLICATIONS

Search Report dated May 21, 2015, by the European Patent Office as the Searching Authority for International Application No. 14199193. 5, 5 pages.

(Continued)

*Primary Examiner* — Steven M Sutherland
*Assistant Examiner* — Thuyhang N Nguyen
(74) *Attorney, Agent, or Firm* — Buchanan Ingersoll & Rooney PC

(57) ABSTRACT

The invention concerns a gas turbine fuel pipe, having a fuel line, the fuel line having a fuel line volume, a fuel line outer wall and an opening in the fuel line outer wall, a damper having a damper volume and a damper outer wall and attached in fluid communication with the fuel line, wherein the damper covers the opening in the fuel line outer wall, and a perforated lining extending across at least part of the opening in the fuel line outer wall.

13 Claims, 9 Drawing Sheets

(52) U.S. Cl.
CPC ...... *F05D 2260/96* (2013.01); *F23D 2210/00* (2013.01); *F23R 2900/00014* (2013.01)

(56) References Cited

U.S. PATENT DOCUMENTS

2006/0000220 A1   1/2006   Sattinger
2014/0238026 A1   8/2014   Boardman et al.

OTHER PUBLICATIONS

Chinese Search Report dated Nov. 21, 2018, issued in CN 201510951831.1, and English translation thereof.
First Chinese Office Action dated Dec. 11, 2018, issued in CN 201510951831.1, and English translation thereof.

\* cited by examiner

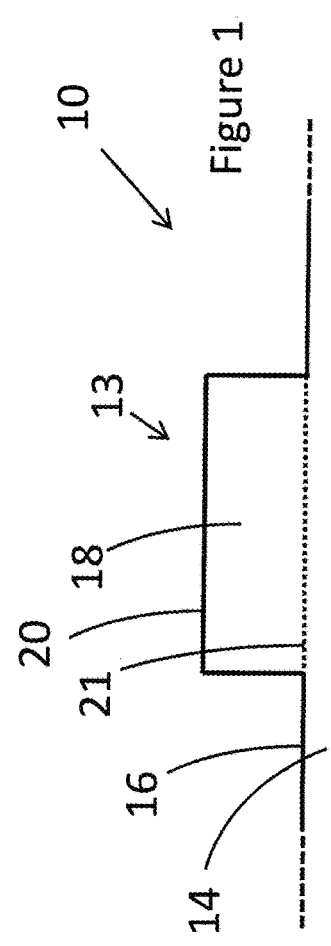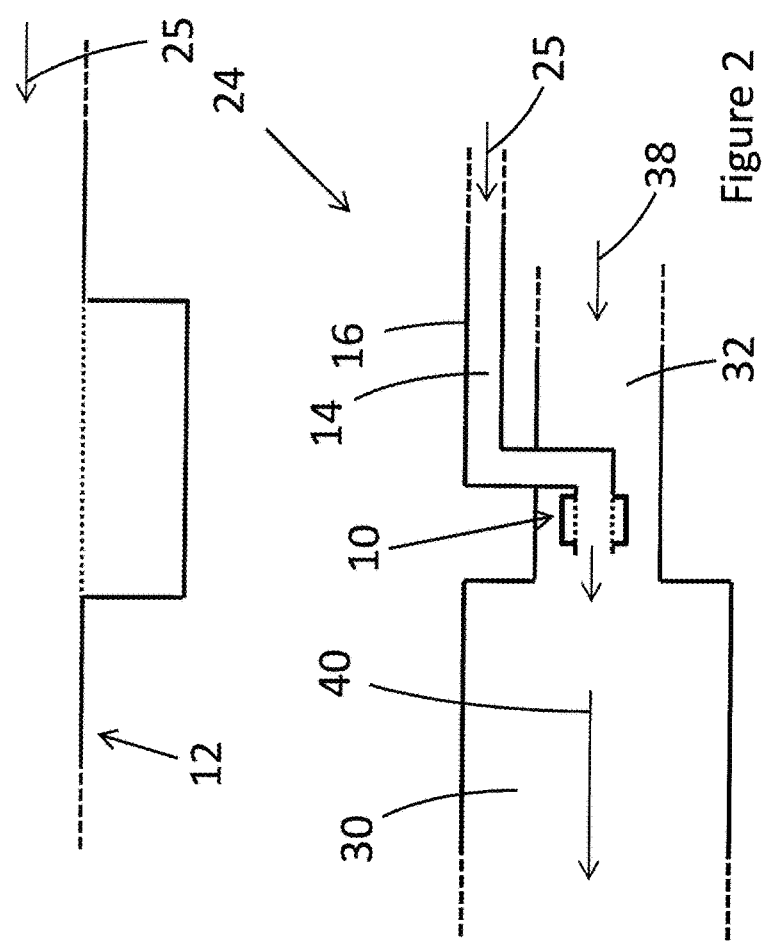

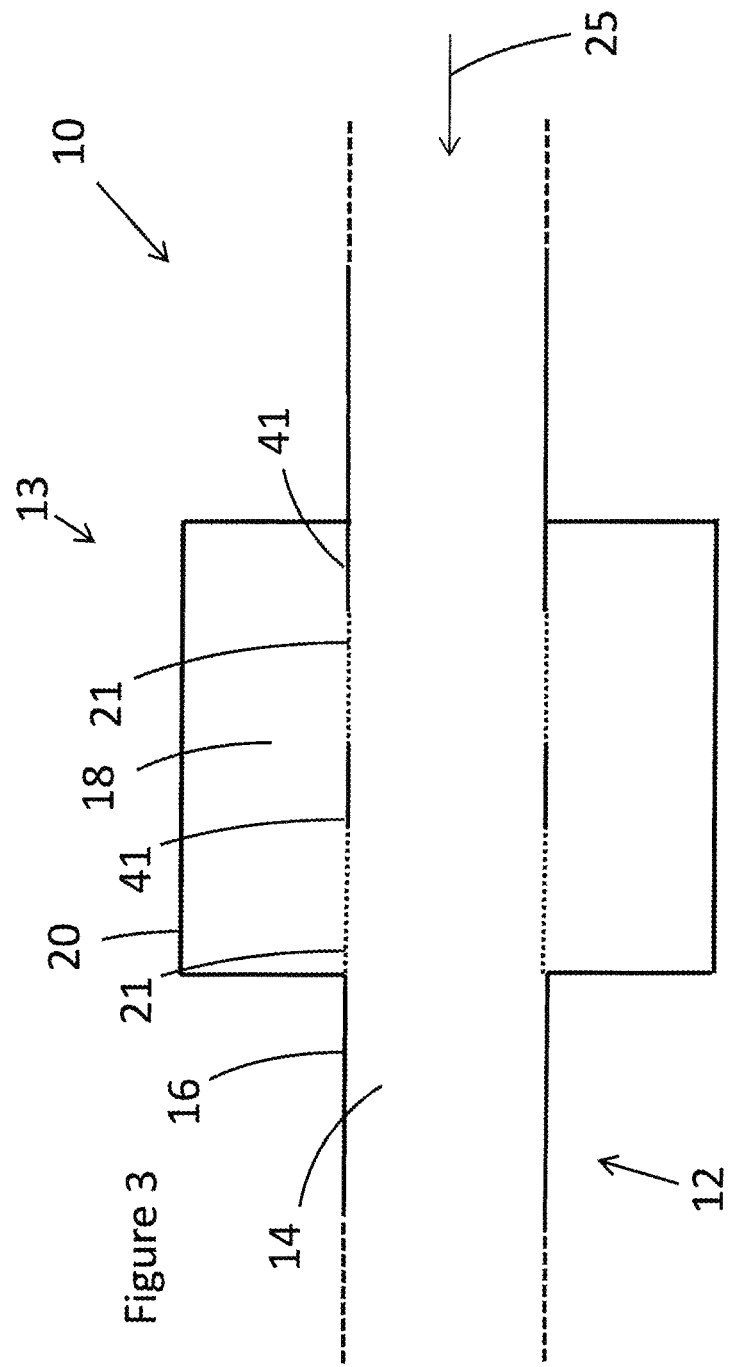

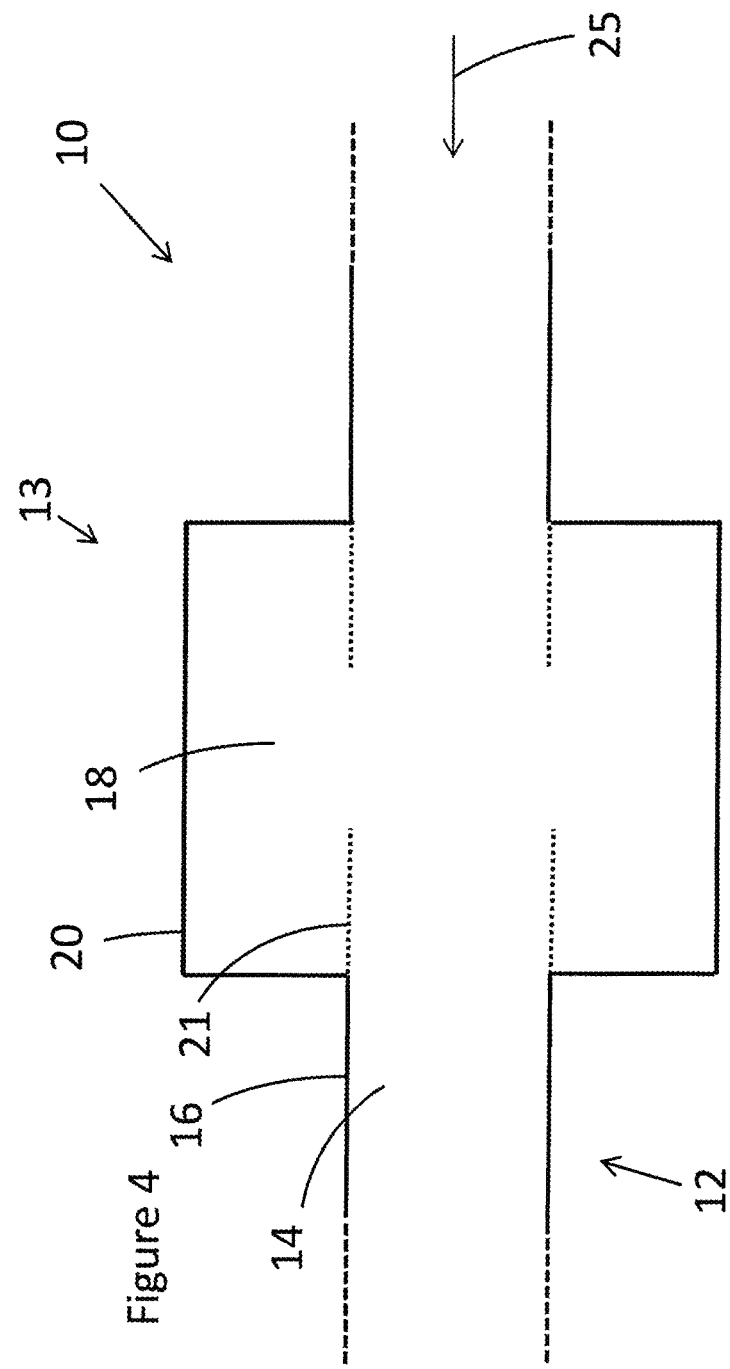

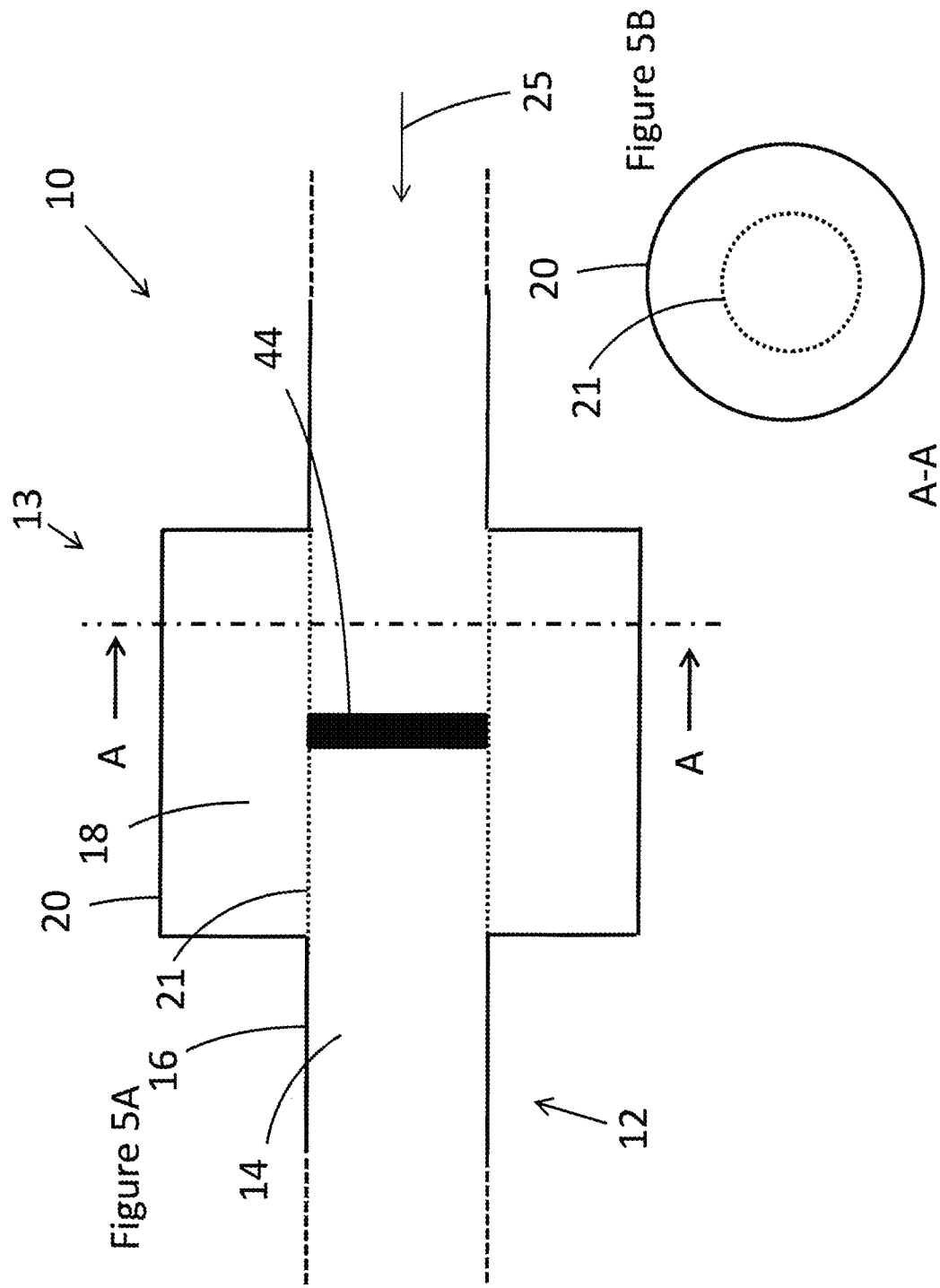

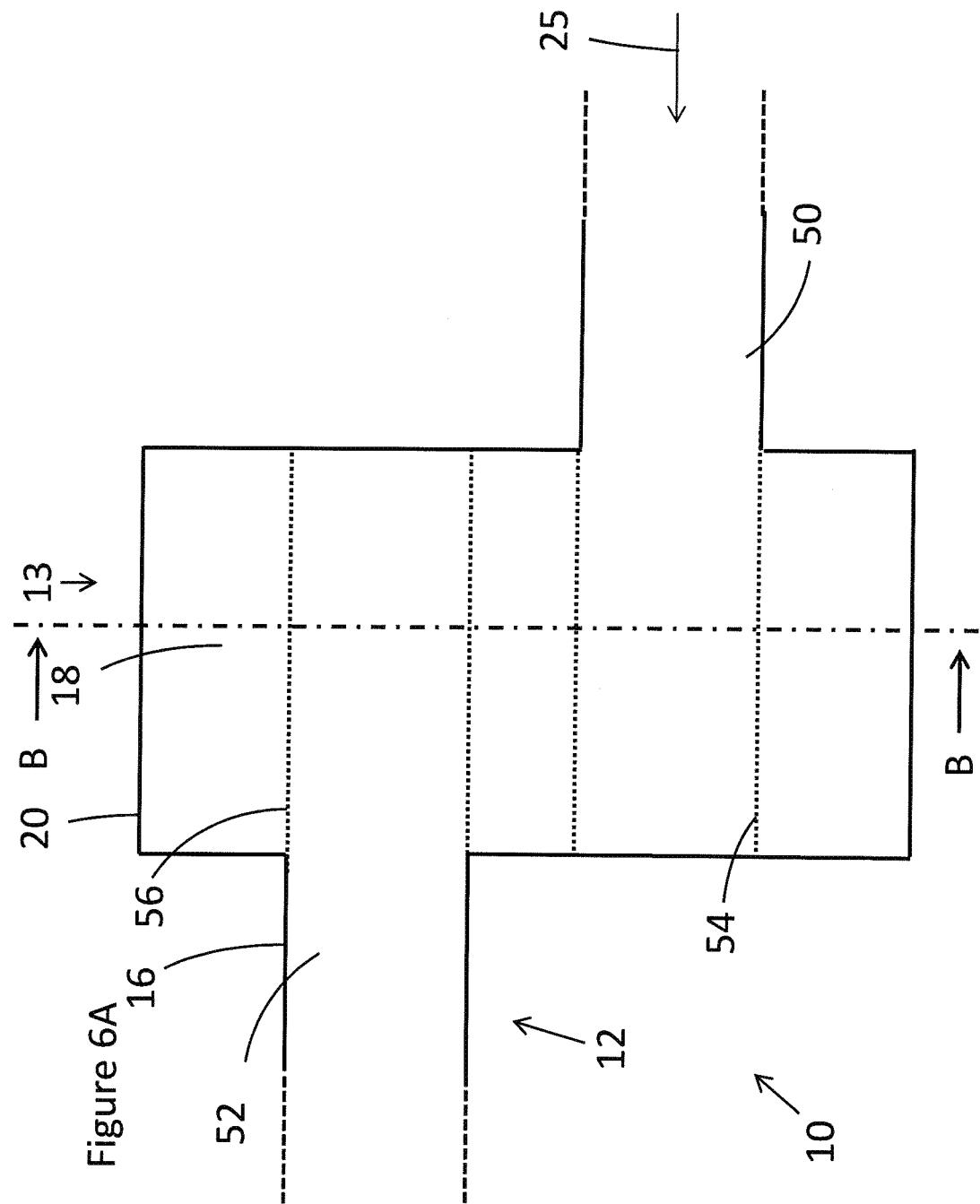

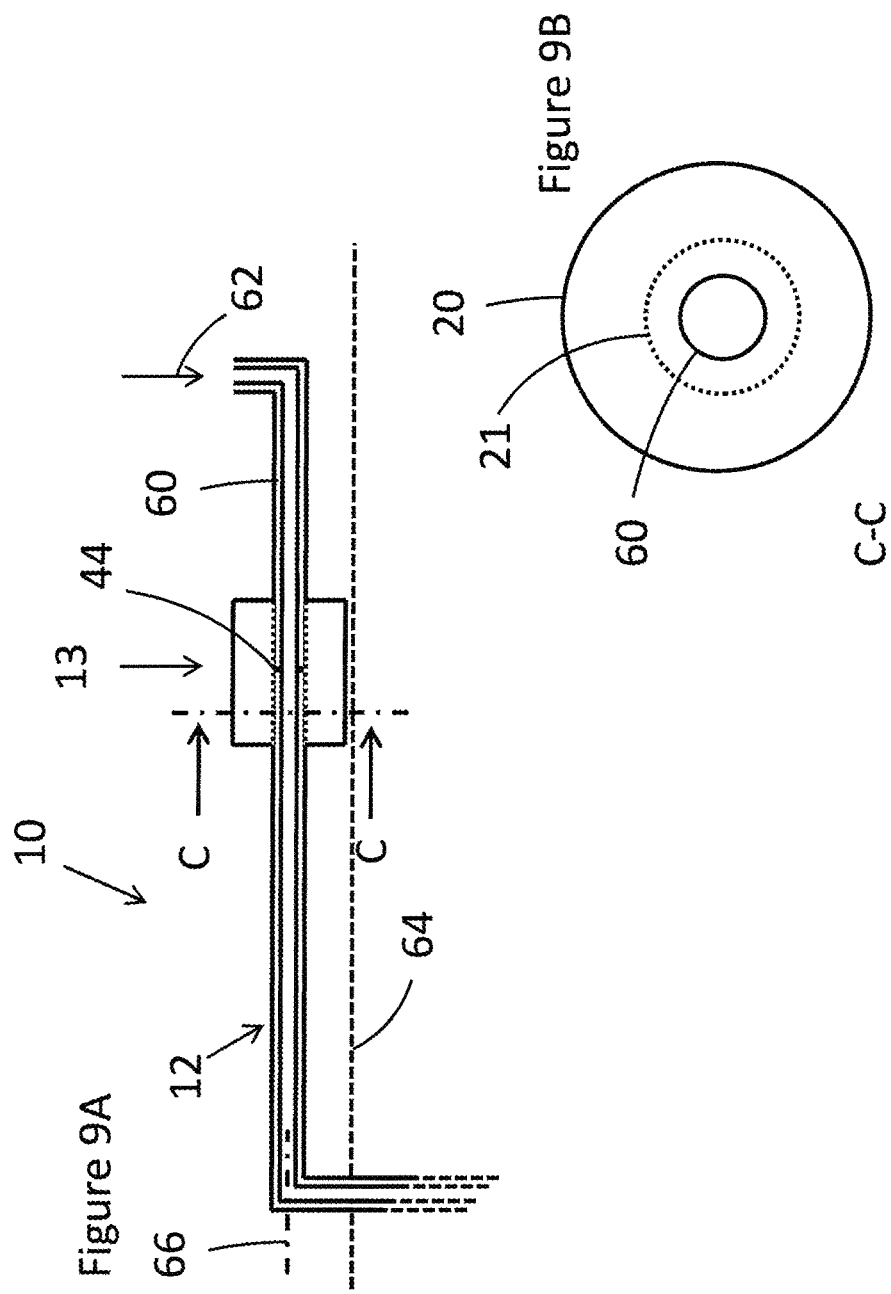

GAS TURBINE FUEL PIPE COMPRISING A DAMPER

TECHNICAL FIELD

This invention relates to gas turbine fuel pipes, and particularly to gas turbine fuel pipes comprising a damper.

BACKGROUND OF THE INVENTION

Acoustic pulsations generate in the combustion chamber of gas turbines due to combustion instabilities. These pulsations can propagate in the fuel distribution system (FDS) and can be a source of equivalence ratio and hence heat release fluctuations that in turn enforce combustion instabilities in the combustor. Another source of pulsations in the FDS is flow-induced pulsations in the fuel line. This fuel feed instability mechanism can give rise to combustion instabilities in the combustion chamber. Pulsations in the FDS have been observed during combustor tests to reach high amplitudes. These high amplitude pulsations generate structural vibrations of the FDS that can be detrimental for structural integrity. Combustion instabilities are detrimental for the performances of combustion systems. They decrease the life-time of the combustor hardware and can therefore have a negative effect on gas turbine emissions. Therefore it has been appreciated that a mitigation measure is needed to damp pulsations in the FDS.

In existing technology, the fuel line pressure drop is increased to acoustically decouple the pulsations between the combustion chamber and the fuel distribution system. This increase poses the problem that higher pressure is required to drive the fuel in the engine. Furthermore, increased fuel pressure requirements can increase the cost of the engine, as a dedicated fuel compression system may be needed to obtain sufficient fuel pressure. In addition, this solution only counteracts the coupling between fuel line and combustion chamber but does not have any effect on damping any pulsations that are generated inside the fuel line (fuel feed instability mechanism). Other possibilities to decouple the pulsations between the combustion chamber and the fuel line are the use of gas flow restrictors and dynamically balancing the fuel nozzle. These solutions do provide decoupling of the pulsations between the combustion chamber and the fuel line but do not have an effect on damping the pulsations that are generated inside the fuel line.

Existing solutions that can be used to reduce the coupling between the combustion chamber and the fuel line and that can also reduce pulsations generated inside the fuel line use Helmholtz dampers or expansion chamber dampers. Expansion chamber solutions provide narrow-band acoustic absorption and are reactive dampers. A reactive damper provides acoustic transmission loss (TL) by reflecting back the incoming waves, reducing to a minimum the outgoing waves. The drawback of reactive dampers is that high pulsations can be generated in the fuel line where the incoming waves travel, due to the reflective characteristics of the damper. These high pulsations can give rise to high structural vibrations that are detrimental for the structural integrity.

It has been appreciated that improvements could be made to alleviate the above-mentioned problems.

SUMMARY OF THE INVENTION

The invention is defined in the appended independent claims to which reference should now be made. Advantageous features of the invention are set forth in the dependent claims.

According to a first aspect of the invention, there is provided a gas turbine fuel pipe, comprising a fuel line, the fuel line comprising a fuel line volume, a fuel line outer wall and an opening in the fuel line outer wall, a damper comprising a damper volume and a damper outer wall and attached in fluid communication with the fuel line, wherein the damper covers the opening in the fuel line outer wall, and a perforated lining extending across at least part of the opening in the fuel line outer wall. This enables both acoustic decoupling of the fuel line and combustion chamber and can also damp pulsations generated within the fuel line. Damping can also occur over a range of frequencies.

In general, a perforated pipe damper (or damper) for the fuel distribution system (FDS) of a gas turbine combustor is a reactive damper with dissipation. The reactive features are due to the expansion chamber (damper volume), while the dissipation is due to the interaction of the flow with the acoustic waves at the perforations in the perforated lining. The dissipative characteristics can minimize the build-up of high pulsations in the piping as observed in expansion chamber dampers. Only a minimal pressure drop is induced by the FDS perforated pipe damper, which minimises the fuel feed pressure requirements.

A perforated pipe damper can reduce vibrations and pulsations due to fluctuations in the FDS of a gas turbine combustor. The FDS perforated pipe damper can provide acoustic absorption of waves travelling in the FDS. This can reduce the acoustical coupling between the combustion chamber and the fuel line. Furthermore, this damper can damp pulsations that are generated inside the fuel line (fuel feed instability mechanism). The damper can therefore damp pulsations, and in effect also vibrations caused by the pulsations. The vibrations of the fuel line can cause damage to the hardware. The pulsations can directly affect combustion.

In an embodiment, the perforated lining extends all the way across the opening.

In an embodiment, a perforated lining extends across part of the opening and an imperforate lining extends across the rest of the opening.

In an embodiment, a baffle is placed across at least part of the fuel line within the region of the gas turbine fuel pipe adjacent to the damper. That is, the baffle is placed across at least part of the fuel line in a cross-section of the fuel line perpendicular to the longitudinal axis of the fuel line. This results in fuel passing through the damper, increasing the damping effect.

In an embodiment, a part of the gas turbine fuel pipe upstream of the damper is axially displaced from a part of the gas turbine fuel pipe downstream of the damper.

In an embodiment, the damper extends around the circumference of the fuel line.

In an embodiment, the gas turbine fuel pipe additionally comprises a centre body inside the fuel line, the centre body extending along a longitudinal axis of the fuel line at the point in the fuel line adjacent to the damper. This improves the damping performance. Preferably, the centre body is an inner fuel line inside the fuel line. This allows the use of different fuels in the inner fuel line and fuel line.

In an embodiment, the gas turbine fuel pipe additionally comprises an inner fuel line inside the fuel line and the baffle is attached to the inner fuel line.

In an embodiment, the gas turbine fuel pipe describes at least one and preferably at least two angles of around 90°. This allows the gas turbine fuel pipe to fit round other features of the gas turbine. In an embodiment, the damper is downstream of at least one 90° angle. In another embodiment, the damper is downstream of all the 90° angles. Placing the damper downstream near the fuel injection point can provide more effective reduction of the acoustical coupling between the combustion chamber and the fuel line.

A second aspect of the invention provides a gas turbine comprising the gas turbine fuel pipe of any previous claim.

A third aspect of the invention provides a method of operating a gas turbine, the gas turbine comprising a fuel line, the fuel line comprising a fuel line volume, a fuel line outer wall and an opening in the fuel line outer wall, a damper comprising a damper volume and a damper outer wall and attached in fluid communication with the fuel line, wherein the damper covers the opening in the fuel line outer wall, and a perforated lining extending across at least part of the opening in the fuel line outer wall, the method comprising feeding fuel along the fuel line and damping vibrations and/or pulsations from the combustion chamber and from the fuel line.

BRIEF DESCRIPTION OF THE DRAWINGS

An embodiment of the invention will now be described by way of example only and with reference to the accompanying drawings in which:

FIG. 1 shows an example of a gas turbine fuel pipe according to the present invention;

FIG. 2 shows part of a gas turbine containing the present invention;

FIG. 3 shows an example of a gas turbine fuel pipe according to another embodiment of the present invention;

FIG. 4 shows an example of a gas turbine fuel pipe according to another embodiment of the present invention;

FIG. 5A shows an example of a gas turbine fuel pipe according to another embodiment of the present invention;

FIG. 5B shows a cross-section view of the gas turbine fuel pipe of FIG. 5A;

FIG. 6A shows an example of a gas turbine fuel pipe according to another embodiment of the present invention;

FIG. 9A shows an example of a gas turbine fuel pipe according to another embodiment of the present invention;

FIG. 9B shows a cross-section view of the gas turbine fuel pipe of FIG. 9A;

DETAILED DESCRIPTION OF THE PREFERRED EMBODIMENTS

Figure 6D:
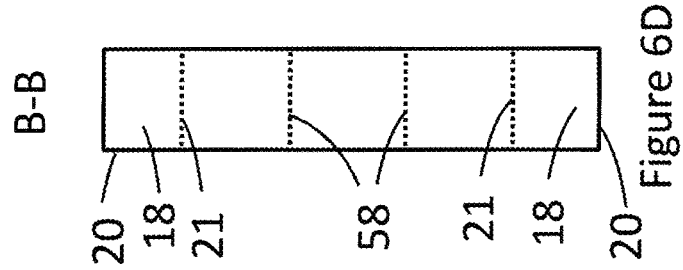
FIGS. 6B, 6C and 6D show cross-section views of three embodiments of FIG. 6A.

FIG. 1 shows part of a gas turbine fuel pipe 10 comprising a fuel line 12 and a damper 13. The fuel line 12 comprises a fuel line volume 14, a fuel line outer wall 16 and an opening in the fuel line outer wall. The damper 13 is in fluid communication with the fuel line and is attached to the fuel line to cover the opening in the fuel line outer wall. The damper 13 comprises a damper volume 18 and a damper outer wall 20. A perforated lining 21 extends across the opening in the fuel line outer wall, delineating the edge of the damper volume and the fuel line volume.

FIG. 2 shows a greater part of the gas turbine fuel pipe shown in FIG. 1 and a partial view of a gas turbine combustor. In addition to features shown in FIG. 1, FIG. 2 also shows a combustion chamber 30 and an air inlet 32. In the embodiment of FIG. 2, a damper is shown downstream of all the 90° angles in the fuel line. One of the 90° angles is in the air inlet, and further upstream, there is a second 90° angle outside the combustor.

When the gas turbine fuel pipe is in use, fuel 25 is fed down the fuel line. Any vibrations or pulsations entering the fuel line from the combustion chamber will tend to be damped in the damper 13, and any vibrations or pulsations coming down the fuel line from the fuel distribution system or from the fuel line itself will also tend to be damped. These can include vibrations or pulsations due to fluctuations in the fuel feed (fuel feed instability mechanism). This damping reduces the acoustical coupling of the pulsations in the combustion chamber from the pulsations in the fuel line.

The damper as described in FIGS. 1 and 2 is a reactive damper with dissipation. The reactive features are due to the expansion chamber (damper volume), while the dissipation is due to the interaction of the flow with the acoustic waves at the perforations in the perforated lining.

One of the key features resulting from this design of damper is that it enables acoustical damping without significantly reducing the injection system pressure drop; that is, the drop in pressure in the fuel as it passes the damper is minimal.

With reference to FIG. 2, fuel 25 flowing down the fuel line is mixed with air 38 (or air mixed with hot gas in the case of a subsequent burner in a sequential combustion system) from the air inlet, with the fuel-air mixture being combusted in the combustion chamber, resulting in hot gas 40.

FIG. 3 shows an embodiment of the gas turbine fuel pipe of FIG. 1. Instead of a perforated lining across the entire opening of the fuel line outer wall, part of the lining is an imperforate lining. In this case, two imperforate sections 21 and two perforate sections 41 are shown. Different numbers of imperforate and perforate sections could be provided.

FIG. 4 shows another embodiment of the gas turbine fuel pipe. In this embodiment, the perforated lining only extends across part of the fuel line outer wall opening.

FIG. 5A shows another embodiment of the gas turbine fuel pipe. In this embodiment, a baffle 44 is placed in the way of the fuel flow. This forces the fuel to pass through the damper volume. This increases the pressure drop over the damper, but improves damping. For completeness, FIG. 5B shows a cross-section of the embodiment of FIG. 5A along line A-A.

FIG. 6A shows another embodiment of the gas turbine fuel pipe. Here, the fuel line is staggered; that is, the fuel line 12 downstream of the damper 13 (downstream fuel line 52) is axially displaced from the fuel line upstream of the damper (upstream fuel line 50), with the axes in question being the axes of the fuel line upstream and downstream of the damper. Dampers of this nature allow more flexibility in the placement of the damper by allowing damper placement on staggered pipes.

Figure 6C:
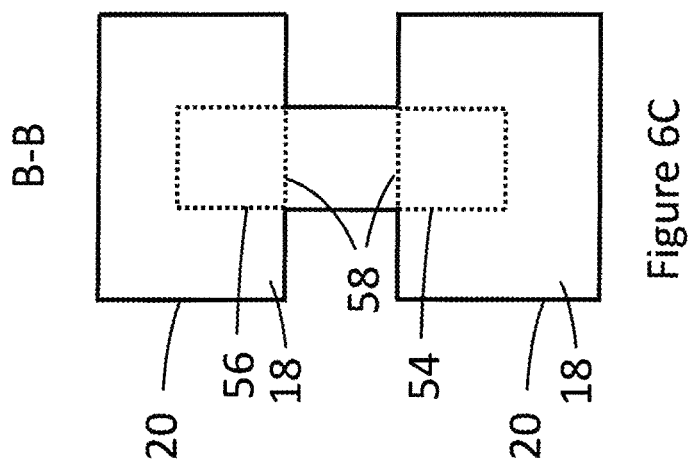
Figure 6B:
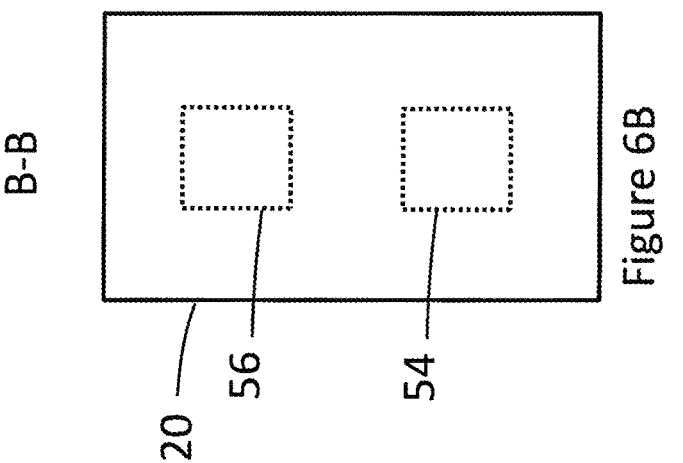

In FIGS. 6B, 6C and 6D, two alternative embodiments of FIG. 6A are shown, with both Figures showing a cross-section along line B-B of FIG. 6A. In FIG. 6B, a first perforated lining 54 is associated with the upstream fuel line 50 and a second perforated lining 56 is associated with the downstream fuel line 52. The fuel flow 25 is forced to go through both the first perforated lining 54 and the second perforated lining 56.

In FIGS. 6C and 6D, damping volumes 18 are still present, but they are separated, and two further perforated linings 58 are included. The fuel flow 25 passes through both further perforated linings. Alternatively, no or only one further perforated lining is provided.

Figure 7:
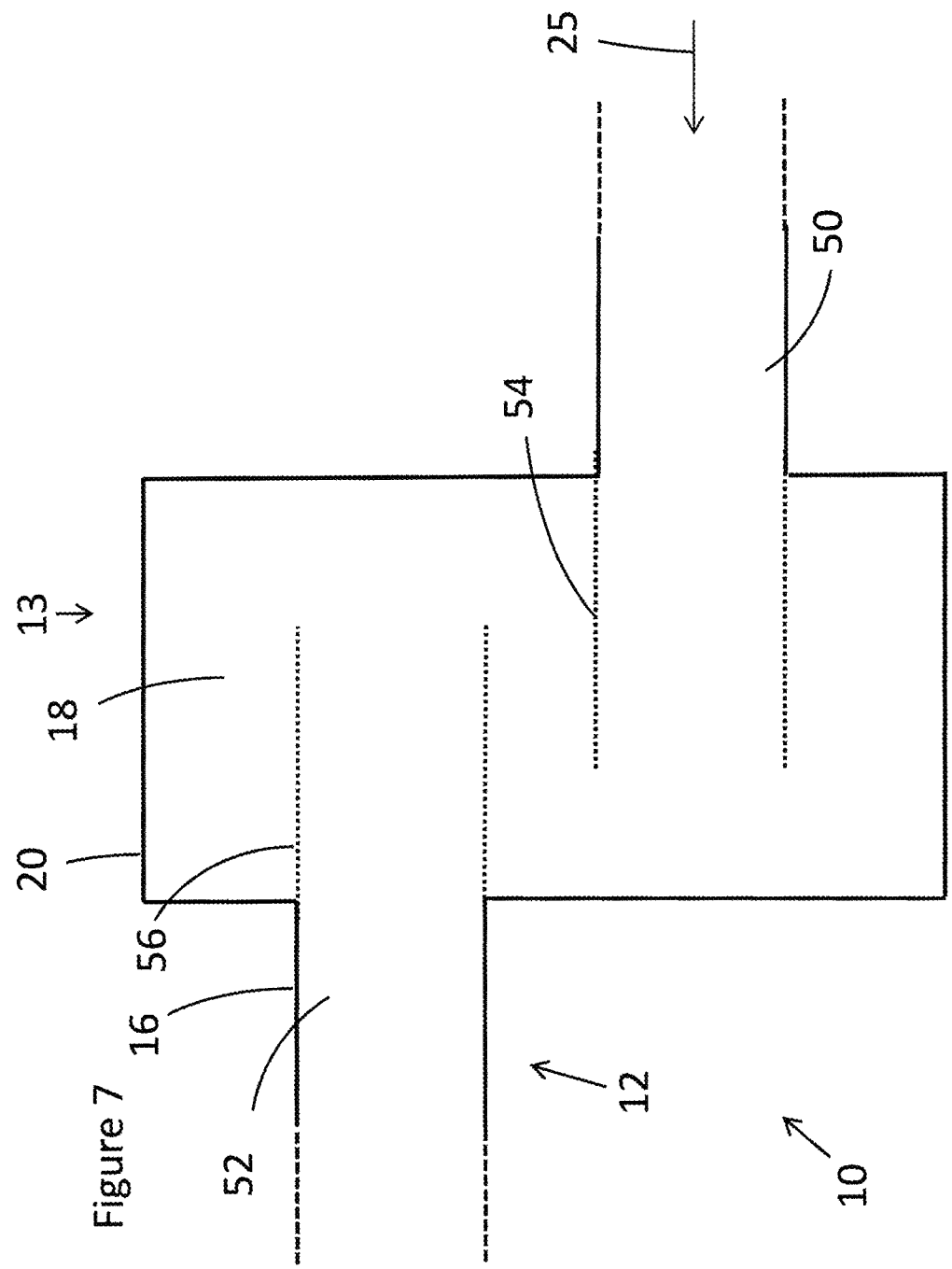
FIG. 7 shows an example of a gas turbine fuel pipe according to another embodiment of the present invention.

FIG. 7 shows another embodiment of the gas turbine fuel pipe, and is similar to FIG. 6A but with the opening in the fuel pipe only partially covered by a perforated lining, similar to the idea in FIG. 4.

Figure 8:
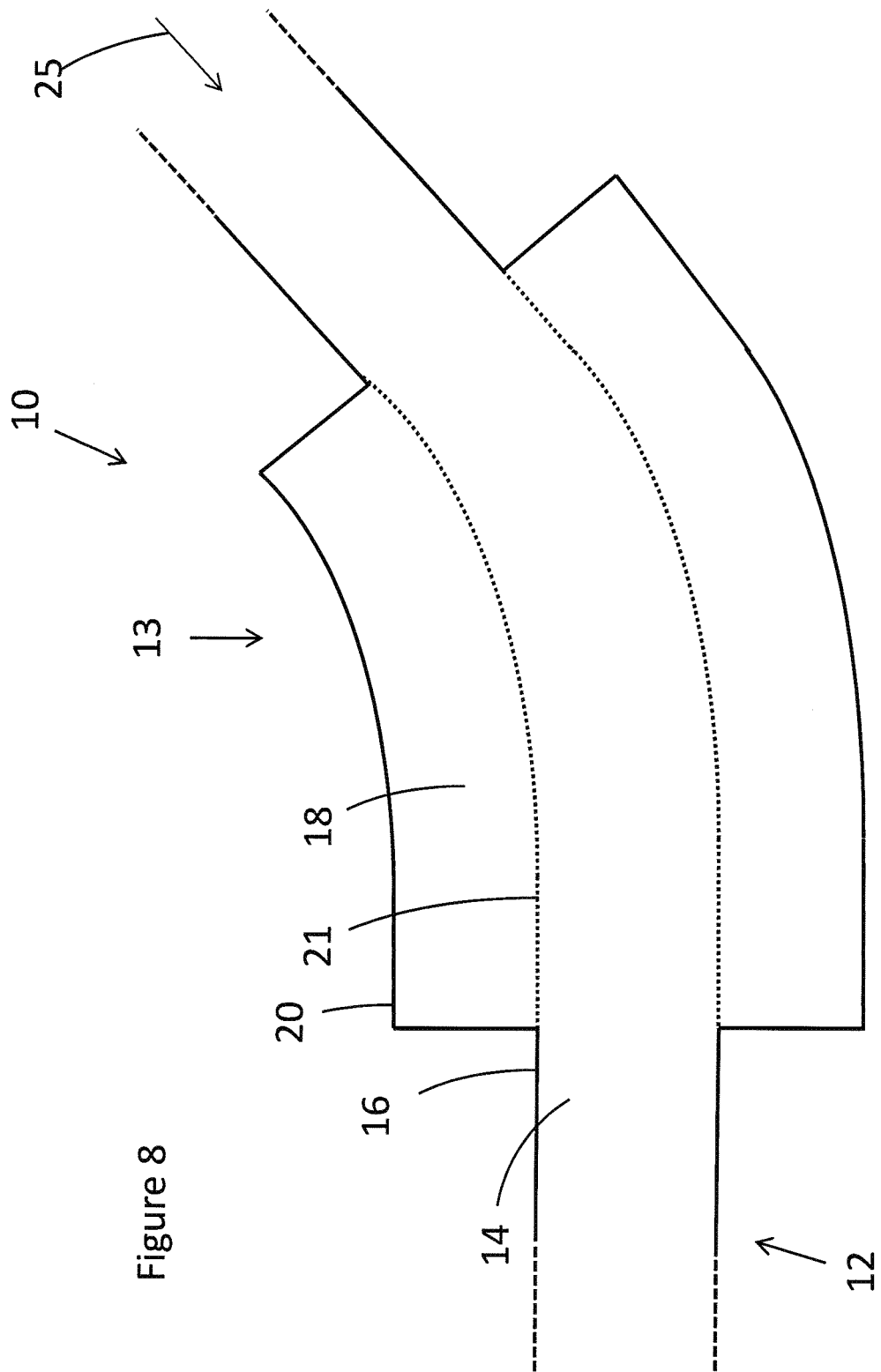
FIG. 8 shows an example of a gas turbine fuel pipe according to another embodiment of the present invention.

FIG. 8 shows another embodiment of the gas turbine fuel pipe. In this embodiment, the damper and fuel line are curved; this can facilitate installation in a curved section of fuel pipe. In general, the damper is not limited to specific shapes, and flexibility of design is available depending on the space available in the gas turbine, the vibrations that need damping, and the shape of the fuel line.

FIG. 9A shows another embodiment of the gas turbine fuel pipe, and FIG. 9B shows a cross-section along line C-C of the gas turbine fuel pipe of FIG. 9A. In this embodiment, the fuel line 12 additionally comprises an inner fuel line 60. The inner fuel line could carry oil for oil operation, whereas the fuel line itself carries gas for gas operation; the opposite is also possible with gas in the inner fuel line and oil in the fuel line. Gas and/or oil is fed at feed 62. The damper is as previously described; a baffle 44 is optionally included, and may be attached to the perforated lining and/or the inner fuel line. The downstream end of the pipe, where the fuel exits into the combustion chamber, is not shown. The gas turbine is also not shown, but a pipe as shown in this embodiment could run along the outside of the combustor, roughly parallel to the longitudinal axis of the combustor. The approximate position of the outer wall of the combustor is shown by the dotted line 64.

In FIG. 9A, a damper is shown upstream (with respect to the fuel flow) of one 90° angle outside the combustor, with this 90° angle corresponding to the upstream 90° angle in FIG. 2. In FIG. 9A, the damper is also downstream of a second 90° angle. The location shown in FIG. 9A is a good location for a damper as it can damp vibrations/pulsations coming downstream from the 90° angle in the fuel line upstream of it (and from any other upstream vibrations/pulsations), to stop these vibrations/pulsations affecting combustion. It can also damp vibrations/pulsations coming upstream from the combustion chamber and the part of the fuel line downstream of the damper.

More generally, rather than an inner fuel line as shown in FIG. 9A, a centre body may be added, extending along the longitudinal axis 66 of the fuel line at the point in the fuel line adjacent to the damper. The centre body extends through at least part of the fuel line adjacent to the damper, and preferably extends beyond the damper upstream and/or downstream along the fuel line.

The embodiments of FIGS. 1 and 3 to 8 show various different ideas. These ideas can be mixed and combined to provide many different combinations; for example, the baffle of FIG. 5A could be incorporated into the embodiments of FIGS. 3 and 4, or embodiments of FIGS. 3 to 5 could be incorporated into the staggered pipe in FIGS. 6A to 6C or into the curved pipe of FIG. 8.

The gas turbine fuel pipe 10 may be provided within a fuel distribution system, additionally comprising fuel injection components such as nozzles and vanes. The gas turbine fuel pipe may be mounted inside or outside of the combustor, as shown by the embodiments. The damper 13 (perforated pipe damper) may be placed at any suitable point in the fuel line, and is not restricted to the positions shown in FIG. 2 and FIG. 9A. Preferably, the damper is as close to the fuel injection point as possible, as this is the point where it is most effective at decoupling fuel line and combustion chamber vibrations.

The fuel line 12 is only shown with changes of direction of 90° angles in the embodiments. This angle does not have to be precisely 90°, and will depend on the structure of the gas turbine combustor. In some cases, the fuel line can describe angles considerably less than 90°, with the embodiment of FIG. 8 showing one example of this.

Any of the embodiments may include an inner fuel line as provided in FIG. 9A. Generally, including an inner fuel line 60 reduces the cross-sectional area of the fuel line compared to embodiments where the inner fuel line is not present.

Multiple dampers can be provided rather than just a single damper, such as shown in FIGS. 6C and 6D. Multiple dampers can also be provided at different points on the same fuel line; for example, a damper can be provided just before the fuel line exit (e.g. FIG. 2) and a second damper can be provided further upstream (e.g. FIG. 9A). Dampers of any of the embodiments could be provided within the embodiment of FIG. 2.

In general, dampers may extend around the circumference of the fuel line, such as in FIGS. 5B and 6B, or only part way round the fuel line, such as in FIGS. 6C and 6D.

The cross-sections of FIGS. 5B and 6B to 6D give some idea of the variety possible in damper cross-section. Although the cross-section shown in FIG. 5B is circular and the cross-sections shown in FIG. 6B to 6D are rectangular, volumes and cross-sections of the damper, fuel line and inner fuel line may be various other shapes and irregular shapes. For example, the fuel lines shown in FIGS. 6B to 6D could be circular in cross-section. Due to the space requirements of various other gas turbine combustor components, the cross-section of the fuel line in particular can vary considerably from one point to another along the fuel line as the fuel line passes around and past other components; this variability in fuel line shape and cross-section area can lead to flow separation and therefore extra vibrations and pulsations. Turns and bends in the pipe can also lead to further flow separation.

The perforated linings described above may be perforated with holes in various shapes and patterns. The perforated lining has one or a plurality of perforations (holes), preferably at least four perforations. The perforations can be straight perforations (with the perforation wall at a right angle from the perforated lining) or inclined perforations (with the perforation wall not at a right angle from the perforated lining). They can have sharp or round edges. They can be thin (thickness lower than diameter) or thick (thickness higher than diameter). The holes are usually all the same but can also be different, for example different sizes or a mix of straight and inclined perforations.

Part or all of the perforated lining may be part of the fuel line outer wall, with perforations made in the fuel line outer wall. Similarly, imperforate linings 41 may also be an integral part of the fuel line outer wall.

A gas turbine comprising the apparatus as described herein will typically contain a compressor, a combustor and a turbine. The gas turbine may be a sequential combustion gas turbine.

The baffle 44 may partially or completely block the fuel flow path. In embodiments with an inner fuel line, the baffle may be attached to the inner fuel line. The baffle may be perforated.

Various modifications to the embodiments described are possible and will occur to those skilled in the art without departing from the invention which is defined by the following claims.

| REFERENCE SIGNS | |
|---|---|
| 10 | gas turbine fuel pipe |
| 12 | fuel line |
| 13 | damper |
| 14 | fuel line volume |
| 16 | fuel line outer wall |
| 18 | damper volume |
| 20 | damper outer wall |
| 21 | perforated lining |
| 24 | gas turbine combustor |
| 25 | fuel flow |
| 30 | combustion chamber |
| 32 | air inlet |
| 38 | air flow |
| 40 | hot gas flow |
| 41 | imperforate lining |
| 44 | baffle |
| 50 | upstream fuel line |
| 52 | downstream fuel line |
| 54 | first perforated lining |
| 56 | second perforated lining |
| 58 | further perforated lining |
| 60 | inner fuel line |
| 62 | fuel feed |
| 64 | combustor outer wall |
| 66 | longitudinal axis |

The invention claimed is:

1. A gas turbine fuel pipe, comprising:
a fuel line, the fuel line having a fuel line volume, a fuel line outer wall and an opening in the fuel line outer wall,
a damper having a damper volume and a damper outer wall and attached in fluid communication with the fuel line, wherein the damper covers the opening in the fuel line outer wall,
a perforated lining extending across at least part of the opening in the fuel line outer wall,
a baffle arranged across at least a part of the fuel line within a region of the gas turbine fuel pipe that is adjacent to the damper, and
the gas turbine fuel pipe additionally comprises: an inner fuel line inside the fuel line and the baffle is attached to the inner fuel line.

2. The gas turbine fuel pipe of claim 1, in which the perforated lining extends all the way across the opening in the fuel line outer wall.

3. The gas turbine fuel pipe of claim 1, in which a perforated lining extends across part of the opening and an imperforate lining extends across the rest of the opening in the fuel line outer wall.

4. The gas turbine fuel pipe of claim 1, wherein the baffle is placed perpendicular to the longitudinal axis of the fuel line.

5. The gas turbine fuel pipe of claim 1, in which the damper extends around the circumference of the fuel line.

6. The gas turbine fuel pipe of claim 1, in which the gas turbine fuel pipe additionally comprises:
a centre body inside the fuel line, the centre body extending along a longitudinal axis of the fuel line at the point in the fuel line adjacent to the damper.

7. The gas turbine fuel pipe of claim 6, wherein the centre body is an inner fuel line inside the fuel line.

8. The gas turbine fuel pipe of claim 1, wherein the gas turbine fuel pipe describes at least one substantially right angle.

9. The gas turbine fuel pipe of claim 8, wherein the damper is downstream of at least one 90° angle.

10. The gas turbine fuel pipe of claim 9, wherein the damper is downstream of all the 90° angles.

11. A gas turbine comprising:
the gas turbine fuel pipe of claim 1.

12. The gas turbine fuel pipe claim 1, wherein the gas turbine fuel pipe describes at least two substantially right angles.

13. A method of operating a gas turbine, the gas turbine having a fuel line, the fuel line having a fuel line volume, a fuel line outer wall and an opening in the fuel line outer wall, a damper having a damper volume and a damper outer wall and attached in fluid communication with the fuel line, wherein the damper covers the opening in the fuel line outer wall, a perforated lining extending across at least part of the opening in the fuel line outer wall, a baffle arranged across at least a part of the fuel line within a region of the gas turbine fuel pipe that is adjacent to the damper, and the gas turbine fuel pipe additionally comprises: an inner fuel line inside the fuel line and the baffle is attached to the inner fuel line, the method comprising:
feeding fuel along the fuel line, and
damping vibrations and/or pulsations from a combustion chamber and from the fuel line.

* * * * *